L. MORRIS.
ANIMAL TRAP.
APPLICATION FILED JULY 23, 1910.
992,232.
Patented May 16, 1911.
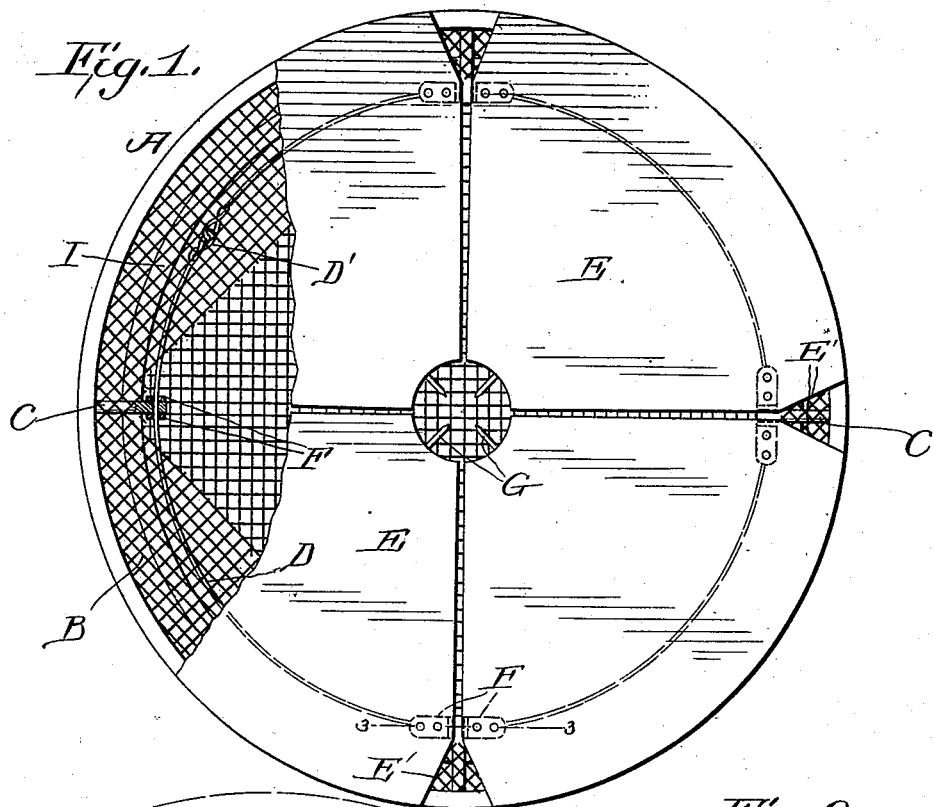
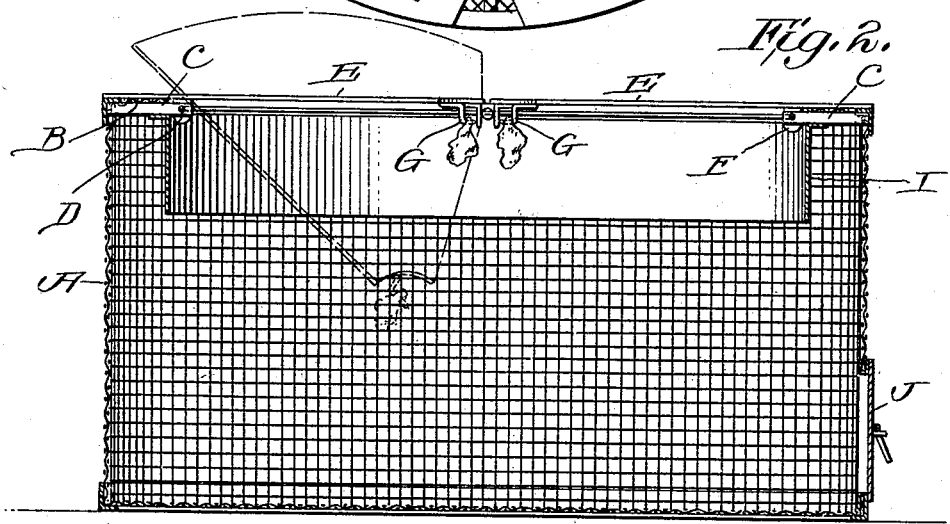
Witnesses
Inventor
Leopold Morris
By Thos. E. Brock
Attorney

UNITED STATES PATENT OFFICE.

LEOPOLD MORRIS, OF VICTORIA, TEXAS, ASSIGNOR OF ONE-THIRD TO JOHN J. WELDER, SR., AND ONE-THIRD TO JAMES J. MURPHY, SR., OF VICTORIA, TEXAS.

ANIMAL-TRAP.

992,232.

Specification of Letters Patent.  Patented May 16, 1911.

Application filed July 23, 1910.  Serial No. 573,443.

*To all whom it may concern:*

Be it known that I, LEOPOLD MORRIS, a citizen of the United States, residing at Victoria, in the county of Victoria and State of Texas, have invented a new and useful Improvement in an Animal-Trap, of which the following is a specification.

This invention relates to certain new and useful improvements in animal traps, the object being to provide a trap with a top which is formed of a plurality of segmental plates pivotally mounted in such a manner that when an animal steps onto one of the same, the plate will drop under its weight so as to throw the animal within the body of the trap.

Another object of the invention is to provide a trap which is exceedingly simple and cheap in construction and one in which the segmental plates forming the top or platform can be easily and quickly placed in position or detached from the body of the trap.

A still further object of the invention is to provide the interior of the trap with a circular guard arranged under the platform parallel with the outer wall of the trap in such a manner that it will be impossible for an animal to escape by crawling up the side and out under one of the platforms.

A further object of the invention is to provide each of the segmental platforms with a bait holding hook, which is so constructed that a piece of bait can be readily placed on the same and held in such a position that it will be impossible for the animal to reach the same without tripping one of the platforms.

With these various objects in view, my invention consists in the novel features of construction, combination and arrangement of parts hereinafter fully described, pointed out in the claims and shown in the accompanying drawings, in which, Figure 1 is a top plan view of my improved trap. Fig. 2 is a vertical transverse section through the same. Fig. 3 is a detail section taken on line 3—3 of Fig. 1.

In carrying out my improved invention, I employ a cylindrical reticulated body A which is provided with reinforcing ring shaped members at its edges as clearly shown and is provided with a flanged top B forming a rectangular opening. Extending inwardly from the opposite sides of the trap under the flange B are rods C provided with apertured ends through which extends a ring D which is preferably formed of wire and has its ends twisted together as clearly shown at D', said wire forming pintles for the hinged platforms as will be later described.

Mounted above the flange B are a plurality of segmental plates E forming platforms, each plate being provided with an eye member F forming a hinge through which the ring D is adapted to pass so as to secure the plates in position upon the top of the trap in such a manner that when a weight is placed upon the plates to the inside of their pivot points, the plates will drop so that in case an animal steps upon the same, the plates will tilt and throw the animal into the body of the trap. The rods C serve the purpose of supporting the ring D and holding the eyes F apart in such a manner that all danger of the segmental platform becoming caught when tilted is prevented. The points of the segmental plates are cut off so as to form a circular opening in the top and each platform carries a depending bait holding hook G upon which a piece of bait is adapted to be placed and supported below the platforms so that when an animal endeavors to reach the bait the platforms will tilt. The side edges of the platforms are reduced as shown at E' so as to prevent the same from binding when two of the platforms are tilted at the same time and it will be seen that by this construction each of the platforms work independently and are so mounted that it will be impossible for a rat or animal of any kind to get off of the same when the platform is tilted.

Arranged within the trap concentric to the wall of the same is a guard ring I which is preferably formed of sheet metal and is carried by the rods C in such a manner that it will be impossible for a rat to climb up the wall of the trap and out under one of the platforms when the same is tilted by another animal entering the trap.

The platforms are so mounted that they will be normally held in a horizontal position in such a manner that when an animal passes upon any one of the platforms and endeavors to reach the bait, the weight of the animal will tilt the platform as clearly shown in Fig. 2 so that the animal will slide into the body of the trap and be retained.

The body of the trap is provided with a hinged door J so that the animals caught can be removed therefrom and the trap is so constructed that the same can be placed in a hole in the ground flush with the surface so that an animal passing over the same will be thrown into the trap or the same can be placed adjacent the animal's hole and used in the ordinary manner.

What I claim is:

1. An animal trap comprising a reticulated cylindrical body having a flange at its upper edge forming a rectangular opening, rods extending inwardly from the outer wall of said body at the corners of said opening having apertured ends, a plurality of segmental plates arranged upon said body provided with eyes at their side edges, a ring extending through said eyes and openings of said rods, a cylindrical guard ring under said rods and depending bait hooks carried by the points of said plates.

2. As a new article of manufacture an animal trap comprising a reticulated body having a plurality of segmental plates mounted thereon, each plate having its apex cut away so as to form a central opening and provided with a depending hoop, depending eyes carried by the side edges of said plates, rods extending inwardly from the wall of said body provided with apertured ends adapted to register with the eyes of the plates, a ring extending through said rods and eyes having its ends connected and a cylindrical guard arranged within said body below said rods.

LEOPOLD MORRIS.

Witnesses:
L. N. HOFER,
I. E. RATCLIFF.

---

Copies of this patent may be obtained for five cents each, by addressing the "Commissioner of Patents, Washington, D. C."